(12) United States Patent
Matsumoto et al.

(10) Patent No.: US 6,743,861 B1
(45) Date of Patent: Jun. 1, 2004

(54) ALKENYLPHENOL COPOLYMER AND PROCESS FOR PRODUCING THE SAME

(75) Inventors: Hitoshi Matsumoto, Chiba (JP); Yukikazu Nobuhara, Ichihara (JP); Shinichi Kimizuka, Ichihara (JP)

(73) Assignee: Nippon Soda Co. Ltd., Tokyo (JP)

( * ) Notice: Subject to any disclaimer, the term of this patent is extended or adjusted under 35 U.S.C. 154(b) by 33 days.

(21) Appl. No.: 10/070,321

(22) PCT Filed: Sep. 1, 2000

(86) PCT No.: PCT/JP00/05958

§ 371 (c)(1), (2), (4) Date: Mar. 1, 2002

(87) PCT Pub. No.: WO01/18083

PCT Pub. Date: Mar. 15, 2001

(30) Foreign Application Priority Data

Sep. 3, 1999 (JP) ............................................. 11-250861

(51) Int. Cl.$^7$ .......................... C08L 31/00; C08L 35/06; C08G 14/04; C08G 8/12
(52) U.S. Cl. ............................. 525/89; 525/94; 528/86; 528/100; 528/152
(58) Field of Search ....................... 525/89, 94; 528/86, 528/100, 152

(56) References Cited

U.S. PATENT DOCUMENTS 3,778,446 A  12/1973  Weigert 6,365,321 B1 * 4/2002 Chen et al. .............. 430/270.1

FOREIGN PATENT DOCUMENTS

| EP | 0 898 201 A1 | 2/1999 |
| JP | 59-199705 | 2/1984 |
| JP | 10-168132 | 6/1998 |

* cited by examiner

*Primary Examiner*—James J. Seidleck
*Assistant Examiner*—Olga Asinovsky
(74) *Attorney, Agent, or Firm*—Dennis G. LaPointe; Mason Law, P.A.

(57) ABSTRACT

An ESCAP type polymer which has a controlled structure wherein the groups protecting phenolic hydroxyl groups have been selectively or partly eliminated or decomposed with an acid and no carboxylic acid residues are contained and which is a narrow-disperse polymer and is suitable for use as a material for a chemical amplification type resist for excimer lasers which has excellent resolution. The process is characterized by subjecting either an alkenylphenol in which the phenolic hydroxyl group has been protected or the alkenylphenol and a vinylaromatic compound to anionic polymerization together with a (meth)acrylic ester to give a block copolymer and eliminating only a given proportion of the groups protecting the phenolic hydroxyl groups from the block copolymer with an acid reagent. Thus, an alkenylphenol copolymer is synthesized which has a ratio of the weight-average molecular weight (Mw) to the number-average molecular weight (Mn), (Mw/Mn), of 1.00 to 1.50 and has no carboxylic acid residues.

6 Claims, No Drawings

ALKENYLPHENOL COPOLYMER AND PROCESS FOR PRODUCING THE SAME

TECHNICAL FIELDS

The present invention relates to narrow-disperse alkenylphenol copolymers that have not known yet and to processes for the preparation of the same. In more detail, it relates to narrow-disperse alkenylphenol copolymers that have controlled structures and with alkenylphenol units, alkenylphenyl ether units and (meth)acrylic ester units as essential constituent units, and to processes for the preparation of the same. The alkenylphenol copolymers of the present invention have expectations to be used as resist materials for excimer lasers.

BACKGROUND ART

Alkenylphenol copolymers useful as resist materials have been well known so far. For example, Japanese Patents Laid-open Nos. Hei 4-211258, 7-209868, 7-49569, 9-160244 and 11-125907 describe random copolymers containing repeating units represented by Formulae (I), (II) and (III). Japanese Patent Laid-open No. Hei 11-125907 describes positive-type radiation-sensitive resin compositions that have, as constituents, resins insoluble or hardly soluble in alkali and protected with groups to be dissociated with acids. The resins become soluble in alkali when the said acid dissociating groups are dissociated. It describes, as constituent units of the said resins, random copolymers or block copolymers each having constituent units represented by Formula (IV) (wherein, $R_{13}$ and $R_{14}$ are each independently hydrogen or methyl, and $R_{15}$ is hydrogen, t-butoxy or another group).

Formula (VI)

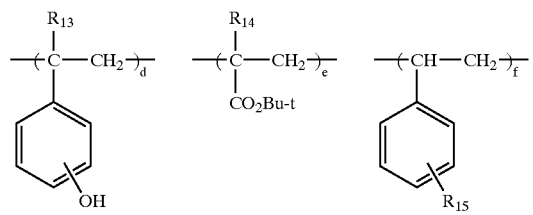

Japanese Patent Laid-open No. Hei 10-265524 describes a polymer compound having a repeating unit represented by Formula (VII) shown below (wherein, R is hydroxyl or $OR_{20}$, and $R_{20}$ is a group unstable to acids). The polymer is cross-linked by a cross-linking group with an intramolecular and/or intermolecular C—O—C groups that are obtained by a reaction of part of the phenolic hydroxyl group and/or carboxyl group, which are represented by R of Formula (VII), with an alkenyl ether compound or halogenated alkyl ether. The polymer has the weight-average molecular weight of 1,000 to 500,000, with the total amount of the said acid-unstable groups and cross-linking groups at a ratio exceeding 0 mole% and less than 80 mole% of the average of the whole phenolic hydroxyl and carboxyl groups.

Formula (VII)

Japanese Patent Laid-open No. Hei 10-53621 describes polymers having a structure represented by Formula (VIII) (wherein, $R_{21}$ is hydrogen or lower alkyl, $R_{23}$ and $R_{24}$ are hydrogen, alkyl optionally substituted with halogen or another, $R_{25}$ is alkyl optionally substituted with halogen or another, and $R_{26}$ is carboxyl optionally substituted with alkyl or another), with dispersibility of more than 1 and less than 1.5.

Formula (VIII)

DISCLOSURE OF THE INVENTION

Homopolymers and copolymers of alkenylphenols, represented by poly-p-hydroxystyrene and the like, are useful as materials for chemical amplification type resists for excimer lasers. Among them, particularly resists produced using copolymers consisting of hydroxystyrenes and acrylic esters are known as so-called ESCAP type resists able to give higher resolution.

In this field, technology to make resolution higher has been advanced remarkably, and higher resolution is always looked for. A desirable structure for the ESCAP type polymers to realize higher resolution is a structure with groups that protect part of the alkenylphenol portions and are eliminated and/or decomposed with acids produced when the groups are exposed to light. Besides, a desirable polymer has a narrow molecular distribution and a controlled structure. This kind of structure controls unnecessary, excessive diffusion of acids generated from photoacid generators of a resist composition, and the solubility of the phenolic hydroxyl or carboxyl groups is controlled so as not to dissolve excessively in alkali developers. Thanks to these effects, the obtained polymer is expected to be a resist material to contribute to make resolution higher.

Many of ESCAP type polymers with such structures and which have been reported so far are synthesized by radical polymerization, and are not satisfactory because of the dispersibility (Mw/Mn) of more than 1.50. The said Japanese Patent Laid-open No. Hei 10-265524 has disclosed an ESCAP type polymer having a narrow molecular distribution and a controlled structure. The polymer is unsatisfactory, however, because the ester portion as a protecting group is a group that is not eliminated with an acid, such as methyl, or that has a carboxylic acid residue. With such an ester structure, it is difficult to make solubility in an alkali developer different between an area exposed to light and that not exposed. Besides, a method is applied of introducing the said group protecting the hydroxyl or carboxylic acid group partially at a later stage. Because of it, there is a problem of difficulty to completely protect particularly the carboxylic acid portions in the polymer.

The said Japanese Patent Laid-open No. Hei 11-125907 describes random copolymers or block copolymers, but has no description of synthetic methods and molecular distributions of these polymers. The said Japanese Patent Laid-open No. Hei 10-53621 has disclosed ESCAP type polymers with narrow dispersibility, but actually described only random copolymers, which were not satisfactory as materials for high resolution resists.

It is an object of the present invention to provide narrow-disperse, ESCAP type polymers that do not contain carboxylic acid residues, have controlled structures, and have groups protecting phenolic hydroxyl groups and being eliminated and/or decomposed with acids selectively and partially.

The inventors of the present invention have studied in earnest to accomplish the above object and found that block copolymerization consisting of alkenylphenols with protected phenolic hydroxyl groups or the said alkenylphenols and vinylaromatic compounds, with (meth)acrylic esters results in eliminating and/or decomposing the groups protecting the phenolic hydroxyl groups with acids selectively and partially. It was confirmed that alkenylphenol copolymers with narrow molecular distributions and controlled structures could be synthesized from the said block copolymers. Thus the present invention has been completed.

The present invention relates to alkenylphenol copolymers that Component (A) containing a repeating unit represented by Formula (I)

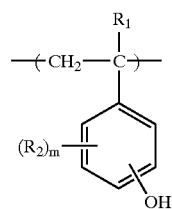

Formula (I)

(wherein, $R_1$ is hydrogen or methyl, $R_2$ is alkyl having 1 to 5 carbons, m is 0, 1 or 2 and $R_2$ is the same or different when m is 2) and a repeating unit represented by Formula (II)

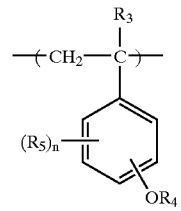

Formula (II)

(wherein, $R_3$ is hydrogen or methyl, $R_4$ is a group to be eliminated and/or decomposed with an acid, $R_5$ is alkyl having 1 to 5 carbons, n is 0, 1 or 2 and $R_5$ is the same or different when n is 2), and Component (B) containing a repeating unit represented by Formula (III)

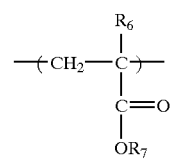

Formula (III)

(wherein, $R_6$ is hydrogen or methyl, and $R_7$ is a group having a t-butyl group and to be eliminated and/or decomposed with an acid) are bound in block in the (A)–(B) form, and that have a ratio (Mw/Mn) of the weight-average molecular weight (Mw) to the number-average molecular weight (Mn) in a range of 1.00 and 1.50 and without carboxylic acid residues. It also relates to the said alkenylphenol copolymers with weight-average molecular weight of 1,000 to 100,000.

The present invention relates to a process for the preparation of the said alkenylphenol copolymer, characterized by that a compound represented by Formula (IV) with the protected hydroxyl group of the phenol residue

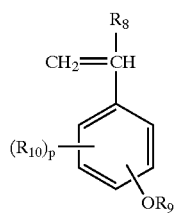

Formula (IV)

(wherein, $R_8$ is hydrogen or methyl, $R_9$ is a group to be eliminated and/or decomposed with an acid, $R_{10}$ is alkyl having 1 to 5 carbons, p is 0, 1 or 2 and $R_{10}$ may be the same or different when p is 2) is polymerized, or a compound of Formula (IV) and a vinylaromatic compound are copolymerized, by anionic polymerization using an anionic polymerization initiator as a polymerization initiator, followed by copolymerization with a (meth)acrylic ester represented by Formula (V)

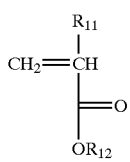

Formula (V)

(wherein, $R_{11}$ is hydrogen or methyl, and $R_{12}$ is a group having a t-butyl group and to be eliminated and/or decomposed with an acid); and the obtained block copolymer is treated with an acid reagent to eliminate and/or decompose only a specified amount of the group protecting the phenolic hydroxyl group. The present invention also relates to a process for the preparation of the said alkenylphenol copolymer, characterized by that only a specified amount of the group protecting the phenolic hydroxyl group is eliminated and/or decomposed with an acid reagent at a temperature below 60° C.

In the "repeating unit of Formula (I)" of the present invention, $R_1$ is hydrogen or methyl. $R_2$ is alkyl having 1 to 5 carbons. Examples of the alkyl group having 1 to 5 carbons include methyl, ethyl, n-propyl, isopropyl, n-butyl and t-butyl. m is 0, 1 or 2. When m is 2, $R_5$ is the same or different. Positions of hydroxyl (OH) group and $R_2$ are not specifically restricted. The hydroxyl group is preferably at the para or meta position of the alkenyl group.

In the "repeating unit of Formula (II)" of the present invention, $R_3$ is hydrogen or methyl. $R_4$ is a group to be eliminated and/or decomposed with an acid. Examples of the group to be eliminated and/or decomposed with an acid include functional groups such as those represented by the following formulae.

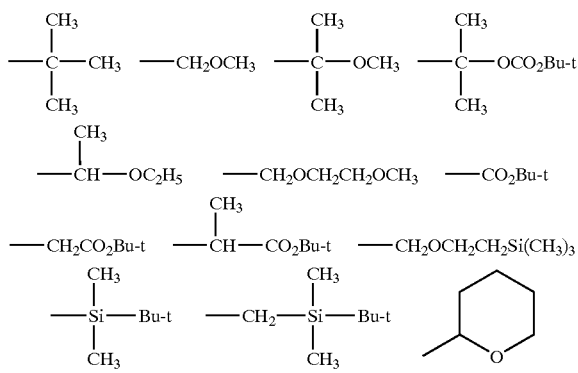

$R_5$ is alkyl having 1 to 5 carbons. Examples of the alkyl group having 1 to 5 carbons include methyl, ethyl, n-propyl, isopropyl, n-butyl and t-butyl, n is 0, 1 or 2. When n is 2, $R_5$ is the same or different. Substitution positions of the alkoxy ($OR_4$) group and $R_5$ are not specifically restricted. The alkoxy ($OR_4$) group is preferably at the para or meta position of the alkenyl group.

In the "repeating unit of Formula (III)" of the present invention, $R_6$ is hydrogen or methyl. $R_7$ is a group having a t-butyl group and to be eliminated and/or decomposed with an acid. Examples of the groups having a t-butyl group and to be eliminated and/or decomposed with an acid include functional groups such as those represented by the following formulae (wherein, u is 0 or 1).

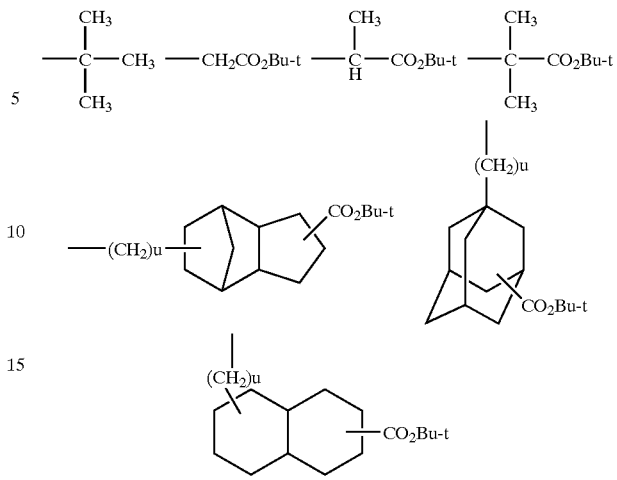

The polymers of the present invention may contain repeating units other than those represented by Formulae (I) to (III), if required. There are no particular restrictions on the repeating units if the units are produced from compounds having double bonds copolymerable with monomers corresponding to Formulae (I) to (III). Preferred are repeating units with no acidic substituents such as sulfonic acid group, carboxyl group and phenolic hydroxyl group. Examples of monomers corresponding to the said repeating units include compounds containing vinyl groups and compounds containing (meth)acryloyl groups.

Examples of the said compounds containing vinyl groups include aromatic vinyl compounds such as styrene, α-methylstyrene, chlorostyrene, 1,1-diphenylethylene and stilbene; aromatic vinyl compounds containing hetero atoms such as vinylpyridine; vinyl ketone compounds such as methyl vinyl ketone and ethyl vinyl ketone; vinyl ether compounds such as methyl vinyl ether and ethyl vinyl ether; and alicyclic vinyl compounds containing hetero atoms such as vinyl pyrolidone and vinyl lactam.

Examples of the said compounds containing (meth)acryloyl groups include (meth)acrylic esters represented by Formula (IX) (wherein, $R_{28}$ is hydrogen or methyl, $R_{29}$ is alkyl having 1 to 12 carbons, hydrocarbon group having an alicyclic structure of 3 or more carbons, hydrocarbon group that has an alicyclic structure containing hetero atoms and having 2 or more carbons, or heteroaryl), or (meth)acrylonitrile.

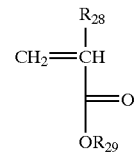

Formula (IX)

Examples of $R_{29}$ of Formula (IX) include methyl, ethyl, n-propyl, isopropyl, n-butyl, t-butyl, n-octyl, n-decyl or functional groups represented by the following formulae (wherein, k is 0 or 1).

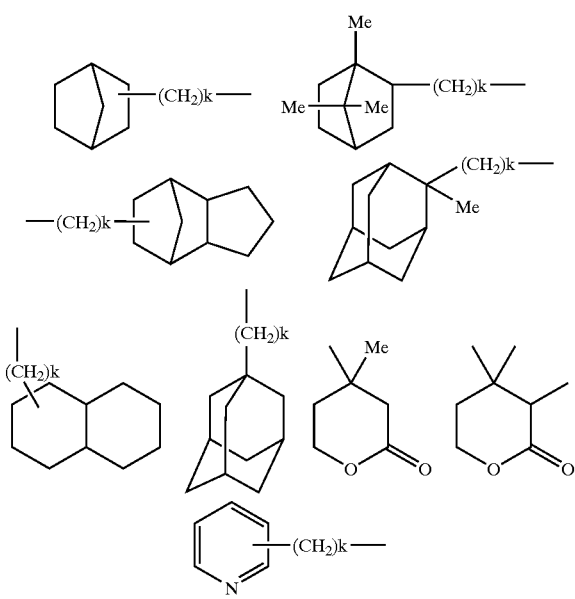

These compounds containing vinyl groups or containing (meth)acryloyl groups can be used alone or as a mixture of two or more. Repeating units obtained from these compounds containing vinyl groups or containing (meth)acryloyl groups can be contained in the alkenylphenol copolymers of the present invention by random or block copolymerization with repeating units of Formulae (I) to (III). An example of Component (A) containing a repeating unit represented by Formula (I) and that of Formula (II) includes Component (A) containing additional repeating units corresponding to styrene, α-methylstyrene and the like as monomers. In this case, in Component A, a mole ratio of the repeating unit of Formula (I) to the total of the repeating unit of Formula (II) and the repeating unit corresponding to styrene or the like as a monomer is preferably in the range of 99/1 to 50/50.

The alkenylphenol copolymers of the present invention are characterized by block copolymerization of Component (A) containing the repeating units of alkenylphenol represented by Formulae (I) and (II) with Component (B) containing the repeating unit of (meth)acrylic ester represented by Formula (III), in the form of (A) (B). Actual examples of the alkenylphenol copolymers of the present invention follow:

Poly[p-t-butoxystyrene/p-hydroxystyrene/t-butyl (meth)acrylate],
Poly[p-t-butoxy-α-methylstyrene/p-hydroxystyrene/t-butyl (meth)acrylate1],
Poly[p-t-butoxystyrene/p-hydroxy-α-methylstyrene/t-butyl (meth)acrylate],
Poly[m-t-butoxystyrene/m-hydroxystyrene/t-butyl (meth)acrylate],
Poly[p-t-butoxystyrene/p-hydroxystyrene/t-butyl methacrylate/t-butyl acrylate],
Poly[p-t-butoxystyrene/p-hydroxystyrene/t-butyl (meth)acrylate/isobonyl (meth)acrylate],
Poly[p-t-butoxystyrene/p-hydroxystyrene/dicyclopentenyl (meth)acrylate/t-butyl (meth)acrylate],
Poly[p-(1-ethoxyethoxy)styrene/p-hydroxystyrene/t-butyl (meth)acrylate],
Poly[p-t-butoxystyrene/p-hydroxystyrene/t-butoxycarbonylmethyl (meth)acrylate],
Poly[p-(tetrahydropyranyloxy)styrene/p-hydroxystyrene/t-butyl (meth)acrylate],
Poly[p-t-butoxystyrene/p-(tetrahydropyranyloxy)styrene/p-hydroxystyrene/t-butyl (meth)acrylate], and
Poly[(p-t-butoxystyrene/styrene/p-hydroxystyrene/t-butyl (meth)acrylate]

A ratio (Mw/Mn) of weight-average molecular weight (Mw) to number-average molecular weight (Mn), which represents the dispersibility of the alkenylphenol copolymers of the present invention, is in the range of 1.00 to 1.50, preferably 1.00 to 1.20. The weight-average molecular weight (Mw) is preferably in the range of 1,000 to 100,000, and more preferably 1,000 to 30,000. A mole ratio [(A)/(B)] of Component (A) to Component (B) is preferably in the range of 95/5 to 5/95, more preferably 95/5 to 70/30. There are no particular restrictions on mole ratios of the repeating unit of Formula (I) to that of Formula (II), which compose Component (A). It is preferable in the range of 99.5/0.5 to 50/50, and more preferably 95/5 to 60/40.

Of the compound of Formula (IV) used for the preparation of the alkenylphenol copolymers of the present invention, $R_8$ is hydrogen or methyl, $R_9$ is a group to be eliminated and/or decomposed with an acid, $R_{10}$ is alkyl having 1 to 5 carbons, and p is 0, 1 or 2. $R_{10}$ is the same or different when p is 2. $R_9$ corresponds to $R_4$ in Formula (II), and $R_{10}$ to $R_5$ in Formula (II). Their actual examples are aforementioned.

Examples of the compounds of Formula (IV) include p-t-butoxystyrene, p-t-butoxy-α-methylstyrene, m-t-butoxystyrene, m-t-butoxy-α-methylstyrene, p-(tetrahydropyranyloxy)styrene, p-(tetrahydropyranyloxy)-α-methylstyrene, p-(l-ethoxyethoxy)styrene and p-(1-ethoxyethoxy)-α-methylstyrene. These can be used alone or as a mixture of two or more.

Examples of vinylaromatic compounds used for the preparation of the alkenylphenol copolymers of the present invention include styrene, o-methylstyrene, p-methylstyrene, p-t-butylstyrene, α-methylstyrene, 1,3-butylstyrene, 1,1-diphenylethylene and stilbene. These can be used alone or as a mixture of two or more.

Of the (meth)acrylic esters of Formula (V) used for the preparation of the alkenylphenol copolymers of the present invention, $R_{11}$ is hydrogen or methyl, $R_{12}$ is a group having a t-butyl group and to be eliminated and/or decomposed with an acid. $R_{12}$ corresponds to $R_7$ in Formula (III). Its actual examples are aforementioned.

Examples of the compounds of Formula (V) include t-butyl (meth)acrylate, t-butoxycarbonylmethyl (meth)acrylate and 1-methyl-t-butoxycarbonylmethyl (meth)acrylate. These can be used alone or as a mixture of two or more.

To produce an alkenylphenol copolymer of the present invention, first anionic polymerization of a compound of Formula (IV) alone, or a compound of Formula (IV) and a vinylaromatic compound, is carried out with an anionic polymerization initiator used as a polymerization initiator, followed by a block copolymerization reaction by adding a (meth)acrylic ester of Formula (V) to the reaction system. The reaction is usually carried out under the atmosphere of inert gas, such as nitrogen or argon, in an organic solvent at −100 to 50° C., preferably −100 to 0° C., more preferably −100 to −20° C.

Examples of anionic polymerization initiators used for the said anionic polymerization include alkali metals and organic alkali metals. Examples of the alkali metals include lithium, sodium, potassium and cesium. Examples of the organic alkali metals include alkyl, alkyl and aryl compounds of the above alkali metals. These anionic polymerization initiators can be used alone or as a mixture of two or more. Examples of the organic alkali metals include ethyl lithium, n-butyl lithium, sec-butyl lithium, t-butyl lithium, ethyl sodium, lithium biphenyl, lithium naphthalene, lithium triphenyl, sodium naphthalene, α-methylstyrene sodium dianion, 1,1-diphenylhexyl lithium and 1,1-diphenyl-3-methylpentyl lithium.

Examples of organic solvents used for the said polymerization reactions include aliphatic hydrocarbons such as n-hexane and n-heptane; alicyclic hydrocarbons such as cyclohexane and cyclopentane; aromatic hydrocarbons such as benzene and toluene; and ethers such as diethyl ether, tetrahydrofuran and dioxane, as well as those usually used for anionic polymerization such as anisole and hexamethylphosphoramide. These are used alone or as a mixed solvent of two or more. A combination of polar solvents and non-polar solvents is particularly preferred. It is more favorable to combine ethers with aromatic or aliphatic hydrocarbons.

When copolymerization is carried out with a (meth) acrylic ester added, an addition of an alkali metal salt and/or alkaline earth metal salt of a mineral acid can control the polymerization reaction. Lithium chloride is particularly preferred to use as the alkali metal salt and/or alkaline earth metal salt of a mineral acid.

From a copolymer thus obtained, a certain amount of the group protecting the phenolic hydroxyl group is eliminated and/or decomposed with an acid reagent, to form the alkenylphenol structure. Examples of solvents used for the elimination/decomposition reaction include alcohols such as methanol and ethanol; ketones such as acetone and methyl ethyl ketone; polyhydric alcohol derivatives such as methyl cellosolve and ethyl cellosolve; and water, in addition to those exemplified for the above polymerization reactions. These may be used alone or as a mixture of two or more.

There are no particular restrictions on acid reagents used. Actual examples of the acid reagents include hydrochloric acid, sulfuric acid, hydrogen chloride gas, phosphoric acid, hydrobromic acid, p-toluenesulfonic acid, 1,1,1-trifluoroacetic acid, methanesulfonic acid, trifluoromethanesulfonic acid and hydrogen sulfates represented by Formula $XHSO_4$ (wherein, X is an alkali metal such as Li, Na or K). A catalytic amount is sufficient to use. Usually, the mole fraction of each unit and the average molecular weight of the whole polymer from the molecular weight of each unit are calculated. The mole number of each unit is calculated from the total weight, average molecular weight and mole fraction of the polymer. An amount of acid reagent used is in the range of 0.1 to 3 equivalents, preferably 0.1 to 1 equivalent, to the mole number of the alkenylphenol unit.

The elimination reaction of the protecting group is usually carried out at room temperature to 150° C. It is however carried out in the range of room temperature and below 70° C., preferably room temperature and below 60° C., and more preferably 30° C. and 50° C., in order to control the hydrolysis of the (meth)acrylic ester portion when the phenolic hydroxyl group is deprotected. The hydrolysis of the ester portion can be controlled even if the reaction is carried out at above 60° C., if the (meth)acrylic ester has a bulky substituent such as alicyclic group having 7 or more carbons or alkyl having an alicyclic group.

In the deprotection reaction, appropriate combinations between a type and concentration of a solvent, type and addition amount of a catalyst, and a reaction temperature and reaction time can control the hydrolysis of the (meth)acrylic ester and deprotection of the phenolic hydroxyl group. For example, the elimination reaction rate can be controlled in a way that a reaction is carried out keeping a temperature at 60° C. at the initial stage of the reaction to remove 80 to 90% of the specified amount, and the reaction temperature is then lowered and, if necessary, water is added to adjust the acid concentration. As a result, a target product can be obtained at the accuracy of about ±1% to the specified amount.

To eliminate only a desired, specified amount of the protecting group, the reaction is tracked as required, and the reaction is stopped when the specified amount is eliminated. Examples of means to track the reaction include IR spectra or methods of measuring changes in polymer solubility.

BEST FORM TO IMPLEMENT THE INVENTION

The present invention is described in more detail in reference to Examples. The scope of the present invention, however, is not restricted at all by the following examples.

EXAMPLE 1

Under a nitrogen atmosphere, 1500 g of tetrahydrofuran (THF) was kept at −60° C., and 30 mmol of n-butyl lithium (NBL) was added. A mixture of 0.8 mol of p-t-butoxystyrene (PTBST) and 0.2 mol of styrene (St) was added dropwise with stirring over an hour. The reaction was continuously carried out further for an hour. The completion of the reaction was confirmed by gas chromatography (GC). Then, 0.5 mol of t-butyl methacrylate (t-BMA) was added dropwise over 30 minutes. The reaction was continuously carried out further for an hour. GC confirmed the completion of the reaction. Methanol was added to the reaction system to stop the reaction. The reaction solution was poured into a large amount of methanol. The deposited polymer was filtrated, washed and dried at 60° C. under reduced pressure for 5 hours to give white powder polymer. The polymerization yield to the total amount of the monomers used was 99.5%.

An analysis by gel permeation chromatography (GPC) showed that the polymer was a narrow-disperse polymer with Mn=8,600 and Mw/Mn=1.17. The copolymerization ratio calculated from $^{13}$C-NMR spectra was PTBST unit/St unit/t-BMA unit=0.8/0.2/0.5 (mole ratio). Based on these facts, it was confirmed that the copolymerization reactions proceeded with no side reactions and the designed copolymer was produced.

10 g of the obtained polymer was dissolved in a mixed solvent of THF/ethanol=4/1 (ratio by weight) to make a 25% solution. After the solution was heated to 40° C., 3 g of concentrated hydrochloric acid was added to the reaction system to initiate the debutylation reaction. A small volume of the solution was collected from the reaction system and analyzed by IR spectra, as required, in order to track the reaction. When it was confirmed that the specified amount was eliminated, the reaction system was promptly cooled in an ice-water bath. The reaction solution was poured into a large amount of water. The deposited polymer was filtrated, washed and dried at 60° C. under reduced pressure for 5 hours to give 7.7 g of white powder polymer.

An analysis by GPC showed that the polymer was a narrow-disperse polymer with Mn=7900 and Mw/Mn=1.16. The copolymerization ratio calculated from $^{13}$C-NMR spectra was PTBST unit/vinyl phenol (PHS) unit/St unit/t-BMA unit=0.4/0.4/0.2/0.5 (mole ratio).

INDUSTRIAL APPLICABILITY

According to the present invention, a copolymer of an alkenylphenol having the hydroxyl group protected, with a (meth)acrylic ester is synthesized using anionic polymerization and the phenolic hydroxyl group is then selectively eliminated. As a result, an ESCAP type alkenylphenol copolymer can be synthesized that has a controlled structure, is a narrow-disperse polymer with the phenolic hydroxyl group protected partially, and has better resolution than that of known polymers in terms of a resist material for KrF excimer lasers.

What is claimed:

1. An alkenylphenol copolymer comprising
Component A containing a repeating unit represented by Formula (I)

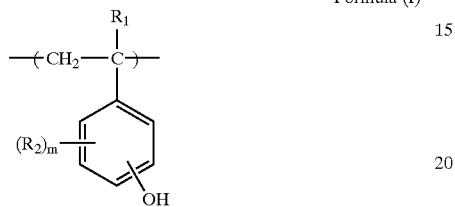

Formula (I)

wherein, $R_1$ is hydrogen or methyl, $R_2$ is alkyl having 1 to 5 carbons, m is 0, 1 or 2 and $R_2$ is the same or different when m is 2 and a repeating unit represented by Formula (II)

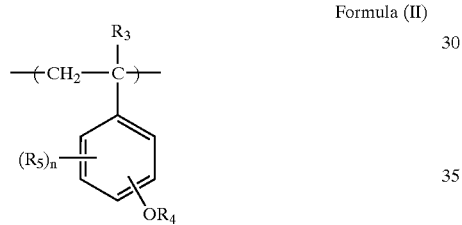

Formula (II)

wherein, $R_3$ is hydrogen or methyl, R4 is a group to be eliminated and/or decomposed with an acid, $R_5$ is alkyl having 1 to 5 carbons, n is 0, 1 or 2 and $R_5$ is the same or different when n is 2 and Component B containing a repeating unit represented by Formula (III)

Formula (III)

wherein, R6 is hydrogen or methyl, and $R_7$ is a group having a t-butyl group and to be eliminated and/or decomposed with an acid, of which Components A and B are bound in block in the form of A—B, has a ratio Mw/Mn of the weight-average molecular weight Mw to the number-average molecular weight Mn in a range of 1.00 and 1.50, and has no carboxylic acid residues.

2. An alkenylphenol copolymer according to claim 1 in which the weight-average molecular weight is 1,000 to 100,000.

3. A process for the preparation of the alkenylphenol copolymer
wherein the alkenylphenol copolymer comprises Component A containing a repeating unit represented by Formula (I)

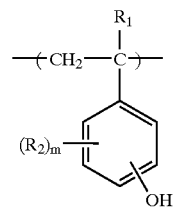

Formula (I)

wherein, $R_1$ is hydrogen or methyl, $R_2$ is alkyl having 1 to 5 carbons, m is 0, 1 or 2 and $R_2$ is the same or different when m is 2 and a repeating unit represented by Formula (II)

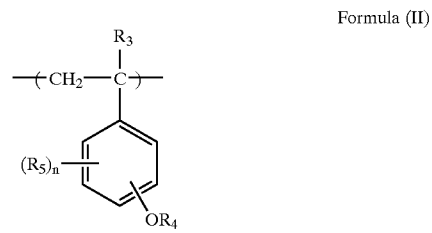

Formula (II)

wherein, $R_3$ is hydrogen or methyl, R4 is a group to be eliminated and/or decomposed with an acid, $R_5$ is alkyl having 1 to 5 carbons, n is 0, 1 or 2 and $R_5$ is the same or different when n is 2 and Component B containing a repeating unit represented by Formula (III)

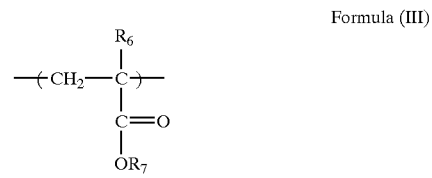

Formula (III)

wherein, $R_6$ is hydrogen or methyl, and $R_7$ is a group having a t-butyl group and to be eliminated and/or decomposed with an acid, of which Components A and B are bound in block in the form of A—B, has a ratio Mw/Mn of the weight-average molecular weight Mw to the number-average molecular weight Mn in a range of 1.00 and 1.50, and has no carboxylic acid residues, in which a compound represented by Formula (IV) whose hydroxyl group of the phenol residue is protected

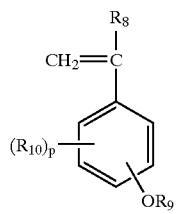

Formula (IV)

wherein, $R_8$ is hydrogen or methyl, $R_9$ is a group to be eliminated and/or decomposed with an acid, $R_{10}$ is alkyl having 1 to 5 carbons, p is 0, 1 or 2 and $R_{10}$ is the same or different when p is 2 is polymerized, or a compound of Formula (IV) and a vinylaromatic compound are copolymerized, by anionic polymerization using an anionic polymerization initiator as a polymerization initiator, followed by copolymerization with a (meth)acrylic ester represented by Formula (V)

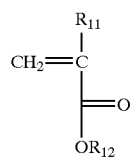

Formula (V)

wherein, $R_{11}$ is hydrogen or methyl, and $R_{12}$ is a group having a t-butyl group and to be eliminated and/or decomposed with an acid; and the obtained block copolymer is treated with an acid reagent to eliminate and/or decompose only a desired specified amount of the group protecting the phenolic hydroxyl group, said treatment being carried out at a control temperature to eliminate and/or decompose only the desired specified amount of the group protecting the phenolic hydroxyl group.

4. A process for the preparation of the alkenylphenol copolymer according to claim 3, in which the step of eliminating and/or decomposing only the desired specified amount of the group protecting the phenolic hydroxyl group with an acid reagent is carried out at below 60° C.

5. A process for the preparation of the alkenylphenol copolymer wherein the alkenylphenol copolymer comprises Component A containing a repeating unit represented by Formula (I)

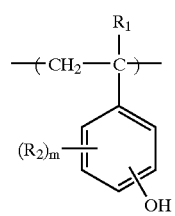

Formula (I)

wherein, $R_1$ is hydrogen or methyl, $R_2$ is alkyl having 1 to 5 carbons, m is 0, 1 or 2 and $R_2$ is the same or different when m is 2 and a repeating unit represented by Formula (II)

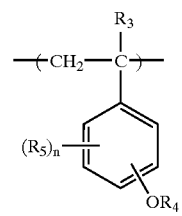

Formula (II)

wherein, $R_3$ is hydrogen or methyl, $R_4$ is a group to be eliminated and/or decomposed with an acid, $R_5$ is alkyl having 1 to 5 carbons, n is 0, 1 or 2 and $R_5$ is the same or different when n is 2 and Component B containing a repeating unit represented by Formula (III)

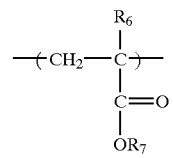

Formula (III)

wherein, $R_6$ is hydrogen or methyl, and $R_7$ is a group having a t-butyl group and to be eliminated and/or decomposed with an acid, of which Components A and B are bound in block in the form of A—B, has a ratio Mw/Mn of the weight-average molecular weight Mw to the number-average molecular weight Mn in a range of 1.00 and 1.50, and has no carboxylic acid residues and in which the weight-average molecular weight is 1,000 to 100,000, in which a compound represented by Formula (IV) whose hydroxyl group of the phenol residue is protected

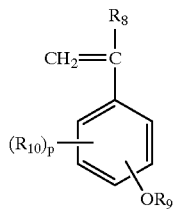

Formula (IV)

wherein, R8 is hydrogen or methyl, $R_9$ is a group to be eliminated and/or decomposed with an acid, $R_{10}$ is alkyl having 1 to 5 carbons, p is 0, 1 or 2 and $R_{10}$ is the same or different when p is 2 is polymerized, or a compound of Formula (IV) and a vinylaromatic compound are copolymerized, by anionic polymerization using an anionic polymerization initiator as a polymerization initiator, followed by copolymerization with a (meth)acrylic ester represented by Formula (V)

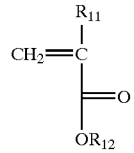

Formula (V)

wherein, $R_{11}$ is hydrogen or methyl, and $R_{12}$ is a group having a t-butyl group and to be eliminated and/or decomposed with an acid; and the obtained block copolymer is treated with an acid reagent to eliminate and/or decompose only a desired specified amount of the group protecting the phenolic hydroxyl group, said treatment being carried out at a control temperature to eliminate and/or decompose only the desired specified amount of the group protecting the phenolic hydroxyl group.

6. A process for the preparation of the alkenylphenol copolymer according to claim 5, in which the step of eliminating and/or decomposing only desired specified amount of the group protecting the phenolic hydroxyl group with an acid reagent is carried out at below 60° C.

* * * * *

UNITED STATES PATENT AND TRADEMARK OFFICE
CERTIFICATE OF CORRECTION

PATENT NO. : 6,743,861 B1
DATED : June 1, 2004
INVENTOR(S) : Hitoshi Matsumoto et al.

It is certified that error appears in the above-identified patent and that said Letters Patent is hereby corrected as shown below:

Title page,
Item [75], Inventors, replace cities of 2nd and 3rd inventors with -- Chiba (JP) --.

Column 11,
Line 39, replace "R4" with -- $R_4$ --.
Line 53, replace "R6" with -- $R_6$ --.

Column 12,
Line 28, replace "R4" with -- $R_4$ --.

Column 14,
Line 31, replace "R8" with -- $R_8$ --.

Signed and Sealed this

Eighth Day of February, 2005

JON W. DUDAS
*Director of the United States Patent and Trademark Office*